(12) United States Patent
Yamazaki

(10) Patent No.: US 6,196,848 B1
(45) Date of Patent: Mar. 6, 2001

(54) INFANT TOY FOR DRAWING COLORED PICTURE

(75) Inventor: Yoshiro Yamazaki, Chiba (JP)

(73) Assignee: Takara Co., Ltd., Tokyo (JP)

( * ) Notice: Subject to any disclaimer, the term of this patent is extended or adjusted under 35 U.S.C. 154(b) by 0 days.

(21) Appl. No.: 09/331,538

(22) PCT Filed: Sep. 10, 1998

(86) PCT No.: PCT/JP98/04082

§ 371 Date: Jun. 23, 1999

§ 102(e) Date: Jun. 23, 1999

(87) PCT Pub. No.: WO99/13955

PCT Pub. Date: Mar. 25, 1999

(30) Foreign Application Priority Data

Sep. 12, 1997 (JP) ............................................. 9-265165
Sep. 16, 1997 (JP) ........................................... 9-008721 U (51) Int. Cl.[7] ......................................................... B43L 1/00
(52) U.S. Cl. ............................. 434/409; 446/131; 434/85
(58) Field of Search ................................... 434/404, 410, 434/85; 446/131, 132; 273/239; 428/323, 328, 329

(56) References Cited

U.S. PATENT DOCUMENTS

| | | | |
|---|---|---|---|
| 3,406,363 | * | 10/1968 | Tate ...................................... 434/409 |
| 3,615,993 | * | 10/1971 | French ................................. 434/409 |
| 3,982,334 | * | 9/1976 | Tate ...................................... 434/409 |
| 4,143,472 | * | 3/1979 | Murata ................................. 434/409 |
| 4,232,084 | * | 11/1980 | Tate ...................................... 434/409 |
| 4,457,723 | * | 7/1984 | Tate ...................................... 434/409 |
| 5,006,000 | * | 4/1991 | House ................................... 434/161 |
| 5,057,363 | * | 10/1991 | Nakanishi ........................... 428/321.5 |
| 5,151,032 | * | 9/1992 | Igawa ................................... 434/409 |
| 5,186,631 | * | 2/1993 | Okutsu ................................. 434/409 |
| 5,411,398 | * | 5/1995 | Nakanishi ............................ 434/409 |
| 5,820,385 | * | 10/1998 | Ohashi ................................. 434/409 |
| 5,949,050 | * | 9/1999 | Fosbenner ........................... 235/449 |

FOREIGN PATENT DOCUMENTS 7309096    11/1995  (JP) .

* cited by examiner

Primary Examiner—Jacob K. Ackun
Assistant Examiner—Kurt Fermstrom
(74) Attorney, Agent, or Firm—Price and Gess (57) ABSTRACT

An infant toy for drawing a colored picture, capable of carrying out a colorful multi-color display, to thereby be suitable as an intellectual training toy. The toy includes a pair of substrates (12a, 12b) and a multi-cell structure arranged between the substrates and including a number of cells (16), which are previously classified into a desired number of regions 4 (4a, 4b, 4c, 4d, . . . ). The toy also includes dispersions (20) encapsulated in the cells of the regions in such a manner that the regions adjacent to each other may exhibit colors different from each other, respectively. The dispersions each include magnetic particles (18) having a respective one of the different colors put thereon, a dispersion medium and a coloring agent constituting a background. Thus, when a surface of one of the substrates is contacted with a magnetic pen (22) over different regions of the regions, the magnetic particles having a corresponding one of the different colors are permitted to be attracted onto the one substrate for every region, so that a trace on the one substrate contacted with the magnetic pen exhibits a multi-color display.

34 Claims, 5 Drawing Sheets

INFANT TOY FOR DRAWING COLORED PICTURE

TECHNICAL FIELD

This invention relates to an infant toy for drawing a colored picture, and more particularly to an infant toy for drawing a colored picture which is suitable for use as an intellectual training toy for infants who begin to exhibit a color identifying ability or be interested in color.

BACKGROUND ART

An infant toy for drawing a colored picture which has been conventionally known in the art includes a magnetic migration display panel by way of example, which is so constructed that two substrates or panels are arranged so as to define therebetween a space in which a multi-cell structure including a plurality of cells is arranged. The cells each have a dispersion encapsulated therein, which includes magnetic particles made of a magnetic material such as magnetite, ferrite or the like, a dispersion medium and a coloring agent constituting a background, as well as a thickening agent added as desired.

The thus constructed conventional infant toy for drawing a colored picture is operated in such a manner that when a surface of the substrate on a front side of the magnetic migration display panel is contacted with a magnetic pen, the magnetic pen attracts the magnetic particles by means of magnetic force thereof, so that the magnetic particles may be transferred from an inner surface of the substrate on a rear side of the display panel to a rear surface of the front-side substrate due to migration, resulting in a black and white display or monochrome display being provided due to a difference in contrast between the dispersion and the magnetic particle.

Figure 5A:
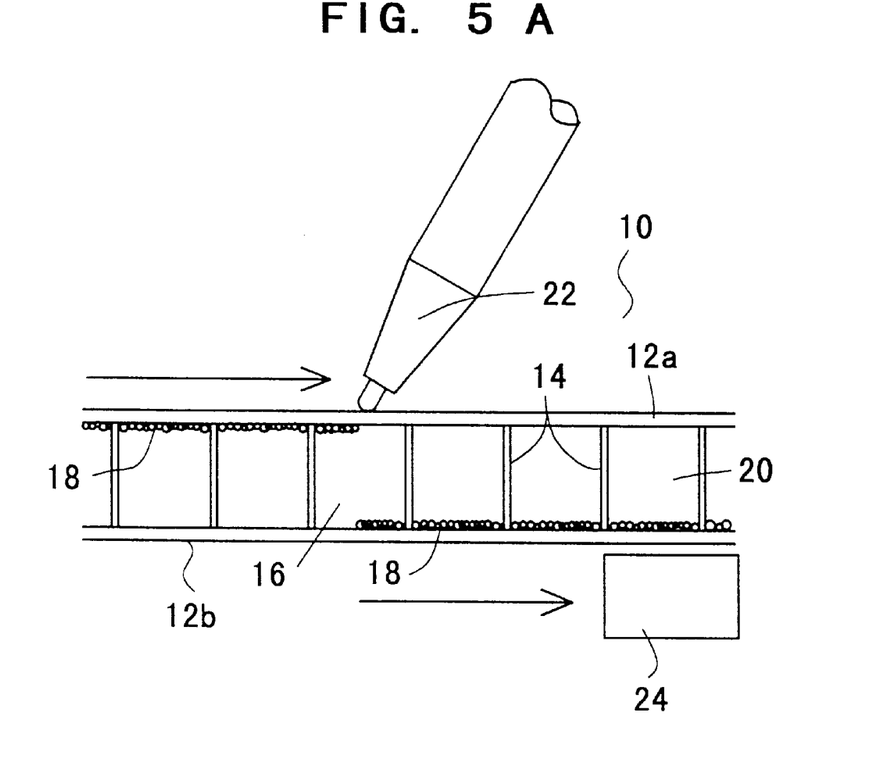
FIG. 5A is a sectional view showing a part of a magnetic migration display panel which has been conventionally used and is incorporated in the first embodiment of the present invention and FIG. 5B is a plan view showing a multi-cell structure incorporated in the magnetic migration display panel.
Figure 5B:
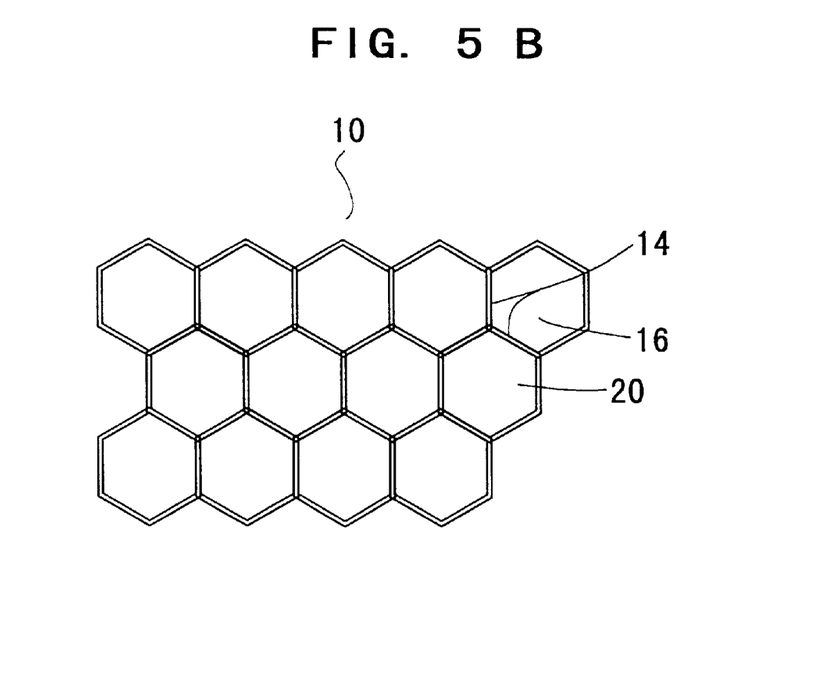

Referring now to FIGS. 5A and 5B, a magnetic migration display panel conventionally used for the infant toy for drawing a colored picture is partially illustrated, which toy is generally designated by reference numeral 10. The magnetic migration display panel 10 includes two non-magnetic panels 12a and 12b arranged opposite to each other, which act as a viewer-side panel and a non-viewer-side panel, respectively. The panels 12a and 12b have a number of partitions 14 arranged therebetween, which cooperate with the panels 12a and 12b to provide a number of cells 16 of a honeycomb structure. In general, the viewer-side panel 12a is formed to have a thickness of about 0.2 to 0.3 mm, the partitions 14 are each formed to have a height of about 0.5 to 1.5 mm, the non-viewer-side panel 12b is formed to have a thickness of about 0.1 mm, and the cells 16 are each formed to have a maximum width of about 4 mm.

The cells 16 each have a dispersion 20 encapsulated therein, which includes magnetic particles 18, a dispersion medium and a coloring agent constituting a background, as well as a thickening agent added as desired. Thus, when a surface of the viewer-side panel 12a is scanned or contacted with a magnetic pen 22, the magnetic particles 18 are magnetically attracted by the magnetic pen 22, resulting in the magnetic particles 18 being moved to a rear surface of the viewer-side panel 12a due to migration, so that a character or the like described by contacting with the magnetic pen 22 may be displayed on the surface of the viewer-side panel 12a due to a difference in color or contrast between the coloring agent constituting the background and the magnetic particles. In general, since the magnetic particles 18 each have a black or dark-brown ground color, the coloring agent constituting the background is constructed to exhibit a white color so as to form a monochrome display.

Then, erasure of the character or the like thus displayed is carried out. For this purpose, a permanent magnet 24 for erasure arranged on a rear surface of the non-viewer-side panel 12b is slid along the surface of the panel 12b. This permits the magnetic particles 18 kept attracted on the rear surface of the viewer-side panel 12a to migrate to an inner surface of the non-viewer-side panel 12b, so that the character or the like may be erased. Thus, when the viewer-side panel 12a is viewed from a front side thereof, only the color of the dispersion 20 is seen, resulting in the character or the like being erased. The viewer-side panel 12a is constituted by a light diffusion plate of an opaque color such as, for example, white in order to prevent the color of the magnetic particles 18 from being seen therethrough when the display is not carried out.

Unfortunately, the conventional infant toy for drawing a colored picture adapted to exhibit a monochrome display and constructed as described above causes fickle infants to readily weary of it and become interested in another play when it is attempted to let them to learn characters, numerals or the like by means of the toy. Thus, the conventional infant toy fails to exhibit an appeal sufficient to attract infants without causing a reduction in efficiency. Also, magnetic particles described above made of magnetite, ferrite or the like have a black or dark-brown ground color, to thereby be suitable for a monochrome display. However, coloring of the magnetic particles using a coloring agent causes a color of the coloring agent to be deteriorated by the ground color of the magnetic particles, so that such magnetic particles are not suitable for a color display. In addition, the magnetic particles are generally formed to have a spherical configuration, to thereby fail to permit the coloring agent to exhibit satisfactory coloring properties, resulting in the coloring agent tending to be peeled or removed from the magnetic particles. Further, such magnetic particles fail to exhibit sufficient response to magnetic force.

Accordingly, it is an object of the present invention to provide an infant toy for drawing a colored picture which is capable of carrying out a multi-color display, to thereby be suitable as an intellectual training toy.

DISCLOSURE OF INVENTION

An infant toy for drawing a colored picture according to the present invention includes a pair of substrates and a multi-cell structure arranged between the substrates and including a number of cells. The cells are previously classified into a desired number of regions. The toy also includes dispersions encapsulated in the cells of the regions in such a manner that the regions adjacent to each other may exhibit colors different from each other, respectively. The dispersions each includes magnetic particles having a respective one of the different colors put thereon, a dispersion medium and a coloring agent constituting a background, as well as a thickening agent added as desired. Thus, when a magnetic means is contacted with a surface of one of the substrates over different regions of the regions, the magnetic particles having a corresponding one of the different colors are permitted to be attracted onto the one substrate for every region, so that a trace on the one substrate contacted with the magnetic means may exhibit a multi-color display.

In the present invention thus constructed, when contacting with the magnetic means such as a magnetic pen is carried out over the desired regions, the magnetic means attracts the magnetic particles having a respective one of different colors put thereon for every region. Therefore, mere description of a single line provides a colorful display wherein the line is constituted by a plurality of portions different in color. Thus, the infant toy for drawing a colored picture according to the present invention attains a multi-color display of characters, numerals, pictures, symbols and the like while rendering colors fresh, to thereby permit infants to attend learning. Also, the regions which provide the multi-color display are usually kept from being seen, so that the resultant multi-color display provides infants with unexpectedness, resulting in the infants being prevented from being tired.

In addition, the infant toy for drawing a colored picture according to the present invention readily provides a multi-color display, to thereby be suitable for infants who begin to exhibit a color identifying ability or be interested in color, so that a sense of color and aesthetic ability of infants may be cultivated.

In a preferred embodiment of the present invention, the regions are formed to have a number of configurations different from each other, respectively.

In another preferred embodiment of the present invention, the magnetic particles are made of stainless steel. Also, the magnetic particles are preferably formed to have odd configurations. When the magnetic particles used in the infant toy for drawing a colored picture are made of stainless steel, a color paint is permitted to exhibit its inherent color because the stainless steel inherently has a light ground color, resulting in the color display of a fresh color being provided. Also, when the magnetic particles have odd configurations, responsibility of the magnetic particles to the magnetic means such as a magnetic pen is enhanced and coloring properties of the color paint is increased. Further, this minimizes peeling of the paint, to thereby minimizing a deterioration in paint with time.

In still another preferred embodiment of the present invention, the multi-cell structure is a honeycomb structure. Alternatively, the cells of the multi-cell structure may each be constituted by a microcapsule.

In a further preferred embodiment of the present invention, the regions are each arranged at a position which permits each of the regions to receive a substantially identical magnetic action from the surface of the one substrate.

In a still further preferred embodiment of the present invention, the toy further includes a magnet member movably arranged behind the other of the substrates and a magnetic element provided at a distal end thereof with a magnetic piece and acting as the magnetic means.

BEST MODE FOR CARRYING OUT THE INVENTION

Now, the present invention will be described hereinafter with reference to the accompanying drawings. Components or members corresponding to those in the conventional infant toy for drawing a colored picture described above are designated at like reference numerals.

Referring first to FIGS. 1 to 5B, a first embodiment of an infant toy for drawing a colored picture according to the present invention is illustrated. An infant toy for drawing a colored picture according to the illustrated embodiment which is generally designated at reference numeral 1 includes a frame 2 made of a plastic material and formed to have a substantially rectangular shape. The frame 2 has a magnetic migration display panel 10 fitted therein. Also, the frame 2 is provided on a lower side thereof with a slit 3 in a manner to extend in a horizontal direction. The slit 3 has a bar-like permanent magnet 24 slidably arranged therein. The permanent magnet 24 is provided on a front side thereof with a grip 24a, which acts to slide the permanent magnet 24. The permanent magnet 24 of a bar-like shape (ruler-like shape) is kept in proximity to a rear surface of the magnetic migration display panel 10 while being connected to the grip 24a. Thus, lateral sliding of the grip 24a permits the permanent magnet 24 to be slid on the rear surface of the magnetic migration display panel 10.

In the illustrated embodiment, the magnetic migration display panel 10 is formed to have substantially the same configuration as that of the prior art described above. Thus, the magnetic migration display panel 10 will be described hereinafter with reference to FIGS. 5A and 5B. The magnetic migration display panel 10 likewise includes two non-magnetic substrates or panels 12a and 12b arranged opposite to each other, which act as a viewer-side panel 12a and a non-viewer-side panel 12b, respectively. The panels 12a and 12b have a number of partitions 14 arranged therebetween. The partitions 14 and the panels 12a and 12b cooperate with each other to define a number of cells 16 of a honeycomb shape or structure. The cells 16 are previously classified into a desired number of regions and each have a dispersion encapsulated therein. The dispersions each include magnetic particles having a respective one of different colors put thereon for every region, as described more detailedly hereinafter. The term "different colors" used herein includes identical colors different in a shade of color, as well as a black color.

The cells 16 each have a dispersion 20 encapsulated therein, which includes magnetic particles 18, a dispersion medium and a coloring agent constituting a background, as well as a thickening agent added as desired. Thus, when a front surface of the viewer-side panel 12a is scanned or contacted with a magnetic pen 22 provided on a distal end thereof with a magnetic piece, the magnetic particles 18 are attracted by the magnetic pen 22, to thereby be moved due to migration, resulting in the magnetic particles 18 being transferred to a rear surface of the viewer-side panel 12a, so that a character or the like defined due to scanning by the magnetic pen 22 may be displayed on the viewer-side panel 12a due to a difference in color between the magnetic particles 18 and the coloring agent constituting the background. In order to prevent the character or the like thus displayed from being partially blurred or indistinct, the cells 16 in each of the regions are preferably arranged at positions which permit the cells 16 to receive substantially the same magnetic action from the front surface of the viewer-side panel 12a.

Then, erasure of the character or the like thus displayed is carried out by sliding the erasing magnet 24 arranged on the rear surface of the non-viewer-side panel 12b along the surface of the panel 12b. This permits the magnetic particles 18 kept attracted onto the rear surface of the viewer-side panel 12a to be moved to an inner surface of the non-viewer-side panel 12b due to migration. Thus, when the viewer-side panel 12a is viewed from a front side thereof, only a color of the dispersion 20 can be seen, resulting in the character or the like displayed being erased.

Now, the magnetic particles 18 will be described hereinafter. In the illustrated embodiment, the magnetic particles 18 are made of stainless steel, which has the following composition:

| Component | Amount |
|---|---|
| Carbon (C) | 0.03% or less |
| Silicon (Si) | 1.5% or less |
| Manganese (Mn) | 0.3% or less |
| Phosphor (P) | 0.04% or less |
| Sulfur (S) | 0.03% or less |
| Nickel (Ni) | 0.6% or less |
| Chromium (Cr) | 11.5 to 13.5% |
| Iron (Fe) | Balance |

Figure 2:
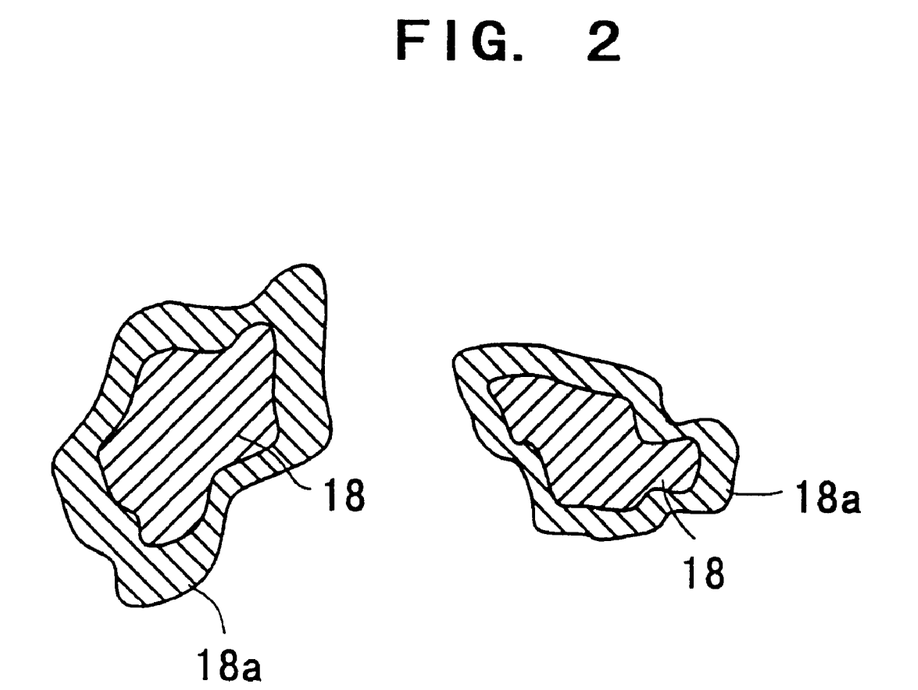
FIG. 2 is a sectional view showing colored magnetic particles having odd configurations which are incorporated in the infant toy for drawing a colored picture shown in FIG. 1.

The magnetic particles 18 are formed to have odd configurations as shown in FIG. 2. The term "odd configurations" or "odd shapes" used herein in connection with the magnetic particles indicates that the particles are not formed to have any unified configuration and have different configurations. Also, the magnetic particles are preferably formed on a surface thereof with complex irregularities.

The magnetic particles each have a size distributed within a range of 30 to 100 μm when it is measured along a major axis thereof. Also, the magnetic particles have an average particle size of 70 to 75 μm.

The magnetic particles 18 are made of stainless steel having the above-described composition and formed to have odd configurations by water atomizing techniques. The water atomizing is carried out so as to impinge injected water under a high pressure onto molten steel, resulting in the steel being powdered. Particles manufactured by the water atomizing have a wide particle size distribution, so that the particles manufactured are subjected to screening or sieving to remove any particle having a size outside the above-described range, resulting in the magnetic particles which have the above-described average particle size being provided.

Now, coloring of the magnetic particles 18 will be described hereinafter. First, the magnetic particles are classified into four groups. Then, the groups of the magnetic particles 18 have different colors put thereon, respectively.

A coating or paint for coloring is constituted by an acrylic resin coating or paint. A polyurethane resin paint, an epoxy resin paint or a vinyl chloride resin paint may be also used for this purpose. However, the acrylic resin paint is superior to the latter paints because the acrylic resin paint is hard to peel and exhibits increased gloss and water and oil resistance, as compared with the latter.

Now, pigments contained or incorporated in the paints will be described hereinafter. In the illustrated embodiment, the pigments include blue, yellow, green and red pigments.

Blue pigment: It is prepared by coloring fine particles of melamine/toluene sulfonamide resin with a fluorescent dye. It exhibits increased resistance to solvent attack and provides a distinct color.

Yellow pigment: It is constituted by chrome yellow ($PbCrO_4$). It is an inorganic pigment mainly consisting of lead chromate and exhibits increased coloring power and hiding power.

Green pigment: It is constituted by chrome oxide ($Cr_2O_3$). It is an inorganic pigment and exhibits increased resistance to chemicals.

Red pigment: Azo organic pigment.

In the illustrated embodiment, acetone or triol is used as a solvent.

Coloring of the magnetic particles 18 is carried out by spray drier techniques while setting a drying temperature at 130±2° C. and drying time at three seconds, respectively. Any pretreatment does not take place.

This procedure permits each of the magnetic particles 18 to be formed on a surface thereof with a colored film or coating of 20 to 30 μm in thickness, as shown in FIG. 2.

Alternatively, the pigments described above may be replaced with pigments or dyes such as an ultramarine blue pigment, aniline blue, oil red, quinoline yellow, methylene blue chloride, phthalocyanine blue, phthalocyanine green and the like.

The magnetic particles 18 prepared as described above are reduced in saturation magnetization by about 10% as compared with ferrite or the like because it is made of stainless steel. However, such a disadvantage may be avoided by increasing magnetic force of the magnetic pen by about 20%. The magnetic particles 18 each inherently have a light ground color because of being made of stainless steel, so that a color of the coloring agent may be exhibited without being deteriorated in essential color thereof while eliminating a necessity of covering the magnetic particle with a hiding film of a whitish silver color or the like. Also, the magnetic particles 18 are formed to have odd configurations, to thereby exhibit increased magnetic sensitivity, paint adhesion and resistance to staining, resulting in minimizing peeling of the paint and a deterioration thereof with time, as compared with that exhibited by spherical magnetic particles.

Such coloring of the magnetic particles 18 as described above permits the magnetic particles 18 to be increased in heat resistance. More specifically, the prior art causes the magnetic particles to agglomerate in a dumpling-like manner. On the contrary, the illustrated embodiment effectively eliminates such agglomeration of the magnetic particles 18.

Figure 1:
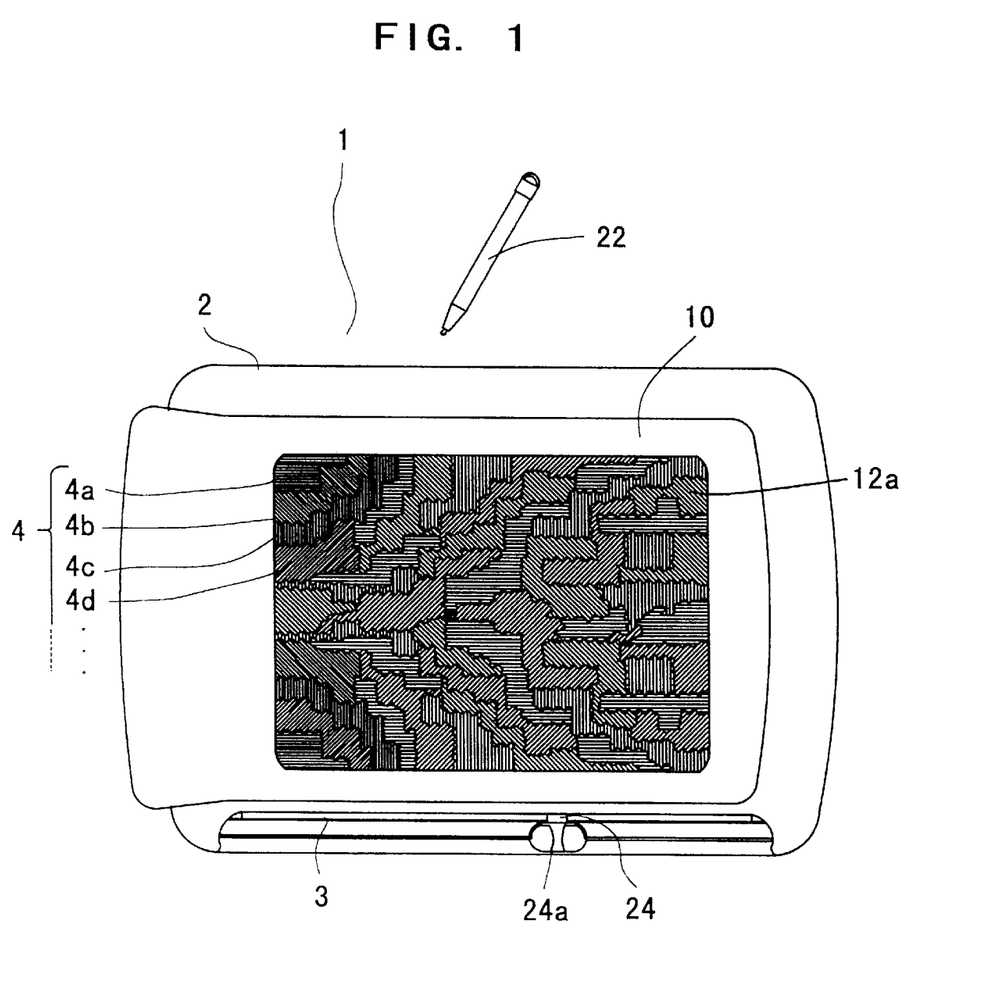
FIG. 1 is a plan view showing a first embodiment of an infant toy for drawing a colored picture according to the present invention.

Now, encapsulation of the magnetic particles colored blue, red, green and yellow in the cells 16 will be described. First, a number of the cells 16 formed between the panels 12a and 12b are previously classified into a desired number of regions 4 (4a, 4b, 4c, 4d, . . . ), as shown in FIG. 1. Then, the magnetic particles 18 colored blue, red, green and yellow are encapsulated in the cells 16 in such a manner that the regions adjacent to each other exhibit colors different from each other, respectively.

For example, the cells 16 of the regions 4 formed to have predetermined desired configurations each have the dispersion 20 containing the magnetic particles 18 of a corresponding one of the different colors encapsulated therein, for example, in such a manner that the cells in the regions 4a have the dispersion 20 which contains the magnetic particles 18 colored red encapsulated therein, the cells in the regions 4b have the dispersion 20 containing the blue-colored magnetic particles 18 encapsulated therein, the cells in the regions 4c have the dispersion 20 containing the green-colored magnetic particles 18 encapsulated therein, and the cells in the regions 4d have the dispersion 20 containing the yellow-colored magnetic particles 18 encapsulated therein. The number of cells 16 constituting each of the regions 4 is suitably determined within a range of about 1 to 200. The regions 4 are preferably formed to have configurations different from each other.

Figure 3:
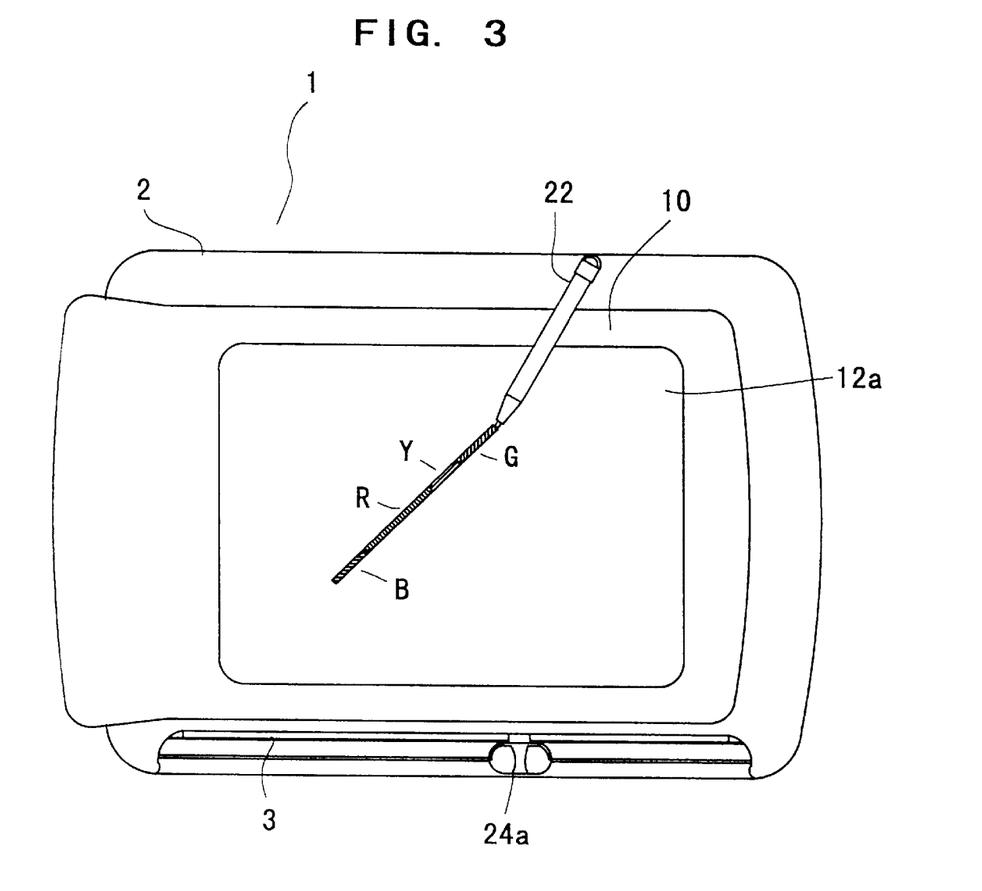
FIG. 3 is a plan view showing a magnetic migration panel on which a single line is described with a magnetic pen.

Thus, a number of the cells 16 defined between the panels 12a and 12b are previously classified into a desired number of the regions 4 (4a, 4b, 4c, 4d, . . . ) and the magnetic particles 18 colored blue, red, green and yellow are encapsulated in the cells 16 in such a manner that the regions adjacent to each other exhibit colors different from each other, respectively. Thus, description of a single line on the front surface of the viewer-side panel 12a with the magnetic pen 22 which is so constructed that the magnet portion provided at the distal end thereof is formed to have a diameter of 1 to 1.3 mm as in the prior art permits a line having a width of about 2 mm to be described, during which the magnetic particles 18 different in color or having blue, red, green and yellow colors put thereon are successively attracted by the magnetic pen in turn every time the regions are changed along a locus or trace of the pen 22. Thus, as shown in FIG. 3, mere description of a single line provides a colorful display wherein the line is constituted by a plurality of portions different in color or a blue portion B, a red portion R, a yellow portion Y and a green portion G which are separated from each other.

Figure 4:
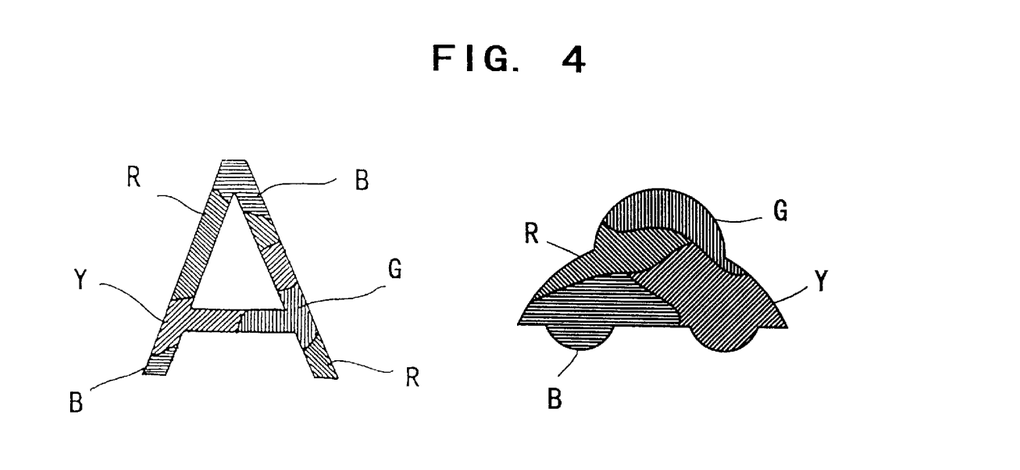
FIG. 4 is a diagrammatic view showing the letter "A" in the alphabet described with a magnetic pen and a picture of a UFO described by stamping of a magnetic stamp.

This is true of a character and a picture. FIG. 4 shows the letter "A" in the alphabet described or scanned with the magnetic pen 22 and a picture of a UFO described with a magnetic stamp by way of example. In FIG. 4, reference characters R, G, B and Y designate a red display portion, a green display portion, a blue display portion and a yellow display portion, respectively. As described above, the infant toy for drawing a colored picture according to the illustrated embodiment attains a multi-color display of characters, numerals, pictures, symbols and the like while rendering colors distinct, to thereby permit infants to attend learning. Also, the illustrated embodiment keeps the regions which will provide the multi-color display from being seen before scanning or contacting the surface of the viewer-side panel with the magnetic pen or magnetic stamp, so that the multi-color display obtained by the scanning provides infants with unexpectedness, resulting in the infants being prevented from being tired. Thus, the infant toy for drawing a colored picture according to the illustrated embodiment effectively functions as an intellectual training toy. In addition, it readily provides a multi-color display, to thereby be suitable for infants who begin to exhibit a color identifying ability or be interested in color, so that a sense of color and aesthetic ability of infants may be cultivated.

In the illustrated embodiment described above, blue, red, green and yellow colors are utilized. It is matter of course that a black color or other colors may be used. Also, colors different in a shade of color, such as black and gray colors, deep red and pink colors, or the like may be used as different colors.

Figure 6:
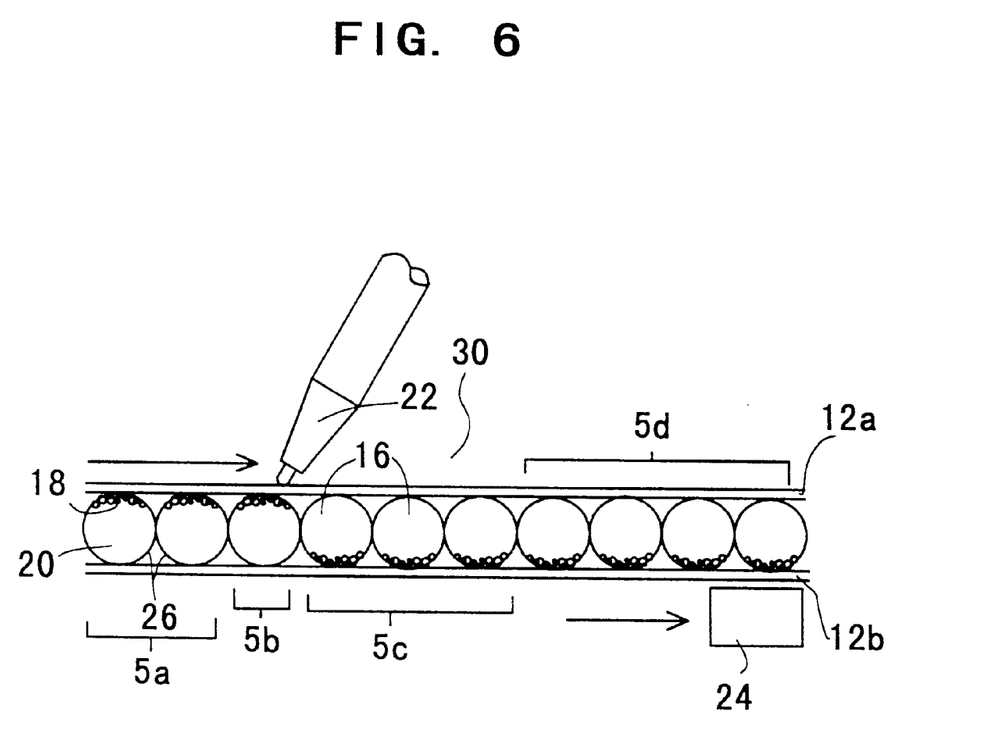
FIG. 6 is a sectional view showing a part of a magnetic migration display panel incorporated in a second embodiment of the present invention.

Referring now to FIG. 6, a second embodiment of an infant toy for drawing a colored picture according to the present invention is illustrated. Components or members incorporated in the second embodiment corresponding to those in the first embodiment described above are designated at like reference numerals.

An infant toy for drawing a colored picture according to the second embodiment generally designated at reference numeral 1 includes a magnetic migration display panel 30. The magnetic migration display panel 30, as shown in FIG. 6, includes two non-magnetic panels 12a and 12b arranged opposite to each other, which function as a viewer-side panel and a non-viewer-side panel, respectively. The panels 12a and 12b have a number of microcapsules 26 of a spherical configuration received therebetween, each of which microcapsules provides a cell 16.

The microcapsules 26 are each constituted by a dispersion 20 and a shell material for covering the dispersion 20. The dispersion 20 includes magnetic particles 18 having colors put thereon, a dispersion medium and a coloring agent constituting a background, as well as a thickening agent added as desired. The shell material may be formed of resin such as a polymer or the like. Resins for the shell material include acrylic resin, methacrylic resin, polystyrene resin, polyester resin, polyurethane resin, polyamide resin, epoxy resin and the like which are transparent so as to permit an interior of the microcapsules to be seen therethrough. The resins may be used alone or in combination.

Manufacturing of the microcapsules 26 may be carried out by phase separation techniques of separating a concentrated layer of a polymer around the dispersion 20 dispersed in a solution of the polymer so as to act as a core material, curing-in-oil coating techniques of curing a polymer around a core material in a polymer solution by means of a polymer curing agent or the like, in-situ polymerization techniques of feeding a monomer and a polymerization catalyst from any one of inner and outer phases of an emulsion in which a core material is dispersed, to thereby cover a surface of the core material with the polymer, or the like. In particular, the phase separation techniques and in-situ polymerization techniques ensure manufacturing of the microcapsules 26 which have a uniform particle diameter and facilitate migration or movement of the magnetic particles 18.

Then, aggregation of the microcapsules 26 provided in the form of a multi-cell structure is previously divided into a desired number of regions 5 (5a, 5b, 5c, 5d, . . . ) and the dispersions 20 containing the magnetic particles 18 colored blue, red, green and yellow are encapsulated in the microcapsules 26 in such a manner that the regions adjacent to each other exhibit colors different from each other, respectively.

More particularly, the regions 5 which are formed to have predetermined desired configurations each have the microcapsules 26 including the dispersion 20 containing the magnetic particles 18 of a corresponding one of the different color encapsulated therein, for example, in such a manner that the microcapsules of the regions 5a have the dispersion 20 which contains the magnetic particles 18 colored red encapsulated therein, the microcapsules of the regions 5b have the dispersion 20 containing the blue-colored magnetic particles 18 encapsulated therein, the microcapsules of the regions 5c have the dispersion 20 containing the green-colored magnetic particles 18 encapsulated therein, and the microcapsules of the regions 5d have the dispersion 20 containing yellow-colored magnetic particles 18 encapsulated therein. The regions 5 are preferably formed to have configurations different from each other.

Thus, a number of the cells 16 which are defined between the panels 12a and 12b and constituted by the microcapsules 26 are previously classified into a desired number of the regions 5 (5a, 5b, 5c, 5d, . . . ) and the magnetic particles 18 colored blue, red, green and yellow are encapsulated in the cells 16 in such a manner that the regions exhibit colors different from each other, respectively. Therefore, description of a picture, a character or the like on a surface of the viewer-side panel 12a with a magnetic pen 22 permits the magnetic particles 18 different in color from each other to be attracted by the magnetic pen 22 every time the regions are varied in order along a locus or trace of movement of the magnetic pen 22, resulting in a colorful multi-color display being provided.

Then, erasure of the character or the like thus displayed is carried out by sliding an erasing magnet 24 arranged on a rear surface of the non-viewer-side panel 12b along the surface of the panel 12b. This permits the magnetic particles 18 kept attracted onto a portion of an inner surface of the microcapsules 26 located near the viewer-side panel 12a to be moved in the microcapsules 26 toward the non-viewer-side panel 12b due to migration, to thereby arrive at a portion of the inner surface of the microcapsules 26 located near the non-viewer-side panel 12b. Thus, when the viewer-side panel 12a is viewed from a front side thereof, only a color of the dispersion 20 can be seen, resulting in the displayed character or the like being erased.

INDUSTRIAL APPLICABILITY

As described above, the infant toy for drawing a colored picture according to the present invention is suitable for use as an intellectual training toy for infants who begin to exhibit a color identifying ability or be interested in color.

What is claimed is:

1. An infant toy for drawing a colored picture, comprising:
   a pair of substrates;
   a multi-cell structure arranged between said substrates and including a number of cells;
   said cells being previously classified into a desired number of regions;
   dispersions encapsulated in said cells of said regions in such a manner that the regions adjacent to each other exhibit colors different from each other, respectively;
   said dispersions each including magnetic particles having a respective one of the different colors put thereon, a dispersion medium and a coloring agent constituting a background;
   whereby contacting a magnetic means with a surface of one of said substrates over different regions of said regions permits the magnetic particles having a corresponding one of the different colors to be attracted onto said one substrate for every region contacted, so that a trace on said one substrate contacted by said magnetic means exhibits a multi-color display wherein the magnetic means causes the magnetic particles to translate through the dispersion medium to a surface adjacent the magnetic means so that a difference between the color of the magnetic particle adjacent the surface and the coloring agent in the dispersion medium as a background is realized while those portions of the substrate not contacted by the magnetic means remains the color of the coloring agent.

2. An infant toy for drawing a colored picture as defined in claim 1, wherein said regions are formed to have a number of configurations different from each other, respectively.

3. An infant toy for drawing a colored picture as defined in claim 2, wherein said magnetic particles are made of stainless steel.

4. An infant toy for drawing a colored picture as defined in claim 2, wherein said magnetic particles are formed to have irregular configurations.

5. An infant toy for drawing a colored picture as defined in claim 2, wherein said multi-cell structure is a honeycomb structure.

6. An infant toy for drawing a colored picture as defined in claim 2, wherein said cells of said multi-cell structure are each constituted by a microcapsule.

7. An infant to for drawing a colored picture as defined in claim 2, wherein said regions are each arranged at a position which permits each of said regions to receive a substantially identical magnetic action from the surface of said one substrate.

8. An infant toy for drawing a colored picture as defined in claim 2, further comprising a magnet member movably arranged behind the other of said substrates and a magnetic element provided at a distal end thereof with a magnetic piece and acting as said magnetic means.

9. An infant toy for drawing a colored picture as defined in claim 1, wherein said magnetic particles are made of stainless steel.

10. An infant toy for drawing a colored picture as defined in claim 9, wherein said magnetic particles are formned to have irregular configurations.

11. An infant toy for drawing a colored picture as defined in claim 9, wherein said multi-cell structure is a honeycomb structure.

12. An infant toy for drawing a colored picture as defined in claim 9, wherein said cells of said multi-cell structure are each constituted by a microcapsule.

13. An infant to for drawing a colored picture as defined in claim 9, wherein said regions are each arranged at a position which permits each of said regions to receive a substantially identical magnetic action from the surface of said one substrate.

14. An infant toy for drawing a colored picture as defined in claim 9, further comprising a magnet member movably arranged behind the other of said substrates and a magnetic element provided at a distal end thereof with a magnetic piece and acting as said magnetic means.

15. An infant toy for drawing a colored picture as defined in claim 1, wherein said magnetic particles are formed to have irregular configurations.

16. An infant toy for drawing a colored picture as defined in claim 15, wherein said multi-cell structure is a honeycomb structure.

17. An infant toy for drawing a colored picture as defined in claim 15, wherein said cells of said multi-cell structure are each constituted by a microcapsule.

18. An infant to for drawing a colored picture as defined in claim 15, wherein said regions are each arranged at a position which permits each of said regions to receive a substantially identical magnetic action from the surface of said one substrate.

19. An infant toy for drawing a colored picture as defined in claim 15, further comprising a magnet member movably arranged behind the other of said substrates and a magnetic element provided at a distal end thereof with a magnetic piece and acting as said magnetic means.

20. An infant toy for drawing a colored picture as defined in claim 1, wherein said multi-cell structure is a honeycomb structure.

21. An infant to for drawing a colored picture as defined in claim 20, wherein said regions are each arranged at a position which permits each of said regions to receive a substantially identical magnetic action from the surface of said one substrate.

22. An infant toy for drawing a colored picture as defined in claim 20, further comprising a magnet member movably arranged behind the other of said substrates and a magnetic element provided at a distal end thereof with a magnetic piece and acting as said magnetic means.

23. An infant toy for drawing a colored picture as defined in claim 1, wherein said cells of said multi-cell structure are each constituted by a microcapsule.

24. An infant to for drawing a colored picture as defined in claim 23, wherein said regions are each arranged at a position which permits each of said regions to receive a substantially identical magnetic action from the surface of said one substrate.

25. An infant toy for drawing a colored picture as defined in claim 23, further comprising a magnet member movably arranged behind the other of said substrates and a magnetic element provided at a distal end thereof with a magnetic piece and acting as said magnetic means.

26. An infant toy for drawing a colored picture as defined in claim 1, wherein said regions are each arranged at a position which permits each of said regions to receive a substantially identical magnetic action from the surface of said one substrate.

27. An infant toy for drawing a colored picture as defined in claim 26, further comprising a magnet member movably arranged behind the other of said substrates and a magnetic element provided at a distal end thereof with a magnetic piece and acting as said magnetic means.

28. An infant toy for drawing a colored picture as defined in claim 1, further comprising a magnet member movably arranged behind the other of said substrates and a magnetic element provided at a distal end thereof with a magnetic piece and acting as said magnetic means.

29. A toy for removably providing visible indicia on a display panel by application of a magnetic member adjacent the display panel, comprising:

a plurality of cells positioned operatively behind the display panel divided into a pluraty of regions;

each cell contains magnetizable particles that are attracted to a position adjacent the display panel when the magnetic member is operatively positioned adjacent the display panel, and a colored non-transparent dispersion medium; and the cells in each region have magnetizable particles of distinctly different colors whereby any indicia drawn on the display panel across said number of adjacent cells will be multi-colored, where the colored non-transparent dispersion medium defines the color of the display panel except where the magnetic member has been operatively positioned to create the visible indicia and the visible indicia will exhibit a multi-color image as it extends across adjacent cells with magetizable particles of different colors.

30. The toy of claim 29 wherein the magnetizable particles are formed of stainless steel.

31. The toy of claim 29 wherein the magnetizable particles are non-spherical in configuration.

32. The toy of claim 31 wherein the magnetizable particles are formed of a water atomized stainless steel with a maximum size within the range of 30 to 100 $\mu$m.

33. The toy of claim 32 wherein the plurality of cells are sub-divided into a matrix of regions, each region being a single color, and a predominant number of the regions have a longer dimensional length than width.

34. A display apparatus for removably providing visible indicia on a display panel by application of a magnetic member adjacent the display panel, comprising:

a plurality of cells positioned operatively behind the display panel and divided into a plurality of regions capable of displaying different colors of visible indicia, each adjacent region has a different boundary area to provide a series of irregular patterns across the display panel;

each cell contains magnetizable particles that are attracted to a position adjacent the display panel when the magnetic member is operatively positioned adjacent the display panel, and a colored non-transparent dispersion medium; and the cells in each region have magnetizable particles of a distinctively different color from adjacent regions whereby any indicia drawn on the display panel across said number of adjacent regions will be multi-colored, where the colored non-transparent dispersion medium defines the color of the entire display panel except where the magnetic member has been operatively positioned to create the visible indicia and the visible indicia will exhibit a multi-color image as it extends across adjacent regions with magnetizable particles of different colors, whereby a line drawn from a common origin to a distal position will exhibit varying lengths of colors depending on the direction of the line from the common origin as a result of the irregular patterns adjacent the common origin.

* * * * *